United States Patent
Geng et al.

(10) Patent No.: US 12,094,122 B2
(45) Date of Patent: Sep. 17, 2024

(54) DETECTION METHOD AND DETECTION DEVICE FOR IMAGE SEGMENTATION MANNER, AND DISPLAY DEVICE

(71) Applicant: BOE TECHNOLOGY GROUP CO., LTD., Beijing (CN)

(72) Inventors: Lihua Geng, Beijing (CN); Yanfu Li, Beijing (CN); Xiaodong Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 434 days.

(21) Appl. No.: 17/607,343

(22) PCT Filed: Dec. 29, 2020

(86) PCT No.: PCT/CN2020/140746
§ 371 (c)(1),
(2) Date: Oct. 28, 2021

(87) PCT Pub. No.: WO2021/169572
PCT Pub. Date: Sep. 2, 2021

(65) Prior Publication Data
US 2022/0222826 A1 Jul. 14, 2022

(30) Foreign Application Priority Data

Feb. 28, 2020 (CN) .......................... 202010131152.0

(51) Int. Cl.
*G06T 7/11* (2017.01)
*G06T 7/70* (2017.01)
(Continued)

(52) U.S. Cl.
CPC .................. *G06T 7/11* (2017.01); *G06T 7/70* (2017.01); *G06T 7/90* (2017.01); *G06V 10/26* (2022.01);
(Continued)

(58) Field of Classification Search
CPC ..... G06T 7/11; G06T 7/70; G06T 7/90; G06T 2207/10024; G06T 2207/20021; G06V 10/26; G06V 10/56; G06V 10/75
See application file for complete search history.

(56) References Cited

U.S. PATENT DOCUMENTS 10,255,683 B1 * 4/2019 Gopal .................... G06V 20/52
11,663,724 B2 * 5/2023 Banach ................... G06T 7/136
382/173

(Continued)

FOREIGN PATENT DOCUMENTS

| CN | 110087086 A | 8/2019 |
| CN | 110782463 A | 2/2020 |
| CN | 111369514 A | 7/2020 |

*Primary Examiner* — Pinalben Patel
(74) *Attorney, Agent, or Firm* — IP & T GROUP LLP

(57) ABSTRACT

A detection method for an image segmentation manner is provided. The detection method includes obtaining four sub-images input by a serial digital interface and formed by dividing an original image, extracting four groups of reference pixel points from the four sub-images according to a set extraction manner, calculating pixel difference values of pixel points according to the four groups of reference pixel points, and determining an image segmentation manner of the serial digital interface according to the pixel difference values.

16 Claims, 9 Drawing Sheets

(51) Int. Cl.
*G06T 7/90* (2017.01)
*G06V 10/26* (2022.01)
*G06V 10/56* (2022.01)
*G06V 10/75* (2022.01)

(52) U.S. Cl.
CPC .............. *G06V 10/56* (2022.01); *G06V 10/75* (2022.01); *G06T 2207/10024* (2013.01); *G06T 2207/20021* (2013.01)

(56) References Cited

U.S. PATENT DOCUMENTS

| | | | |
|---|---|---|---|
| 2004/0146198 A1* | 7/2004 | Herley | H04N 1/00721 |
| | | | 382/173 |
| 2015/0189364 A1 | 7/2015 | Into | |
| 2017/0039683 A1* | 2/2017 | Yamamoto | G06F 3/04842 |
| 2022/0021889 A1* | 1/2022 | Lee | H04N 19/593 |

* cited by examiner

DETECTION METHOD AND DETECTION DEVICE FOR IMAGE SEGMENTATION MANNER, AND DISPLAY DEVICE

CROSS-REFERENCE TO RELATED APPLICATIONS

This application is a national phase entry under 35 USC 371 of International Patent Application No. PCT/CN2020/140746, filed on Dec. 29, 2020, which claims priority to Chinese Patent Application No. 202010131152.0, filed on Feb. 28, 2020, which are incorporated herein by reference in their entirety.

TECHNICAL FIELD

The present disclosure relates to the field of display technologies, and in particular, to a detection method and a detection device for an image segmentation manner, and a display device.

BACKGROUND

A serial digital interface (SDI) is a video interface commonly used in the field of display technologies, and is widely applied in medical displays and various dedicated monitors. The serial digital interface includes four transmission channels. When video data are transmitted through the serial digital interface, each frame image contained in the video data needs to be divided into four sub-images firstly, and then the four sub-images are transmitted through the four transmission channels.

SUMMARY

In an aspect, a detection method for an image segmentation manner is provided. The detection method includes: obtaining four sub-images input by a serial digital interface and formed by dividing an original image; extracting four groups of reference pixel points from the four sub-images according to a set extraction manner; calculating pixel difference values of pixel points according to the four groups of reference pixel points; and determining an image segmentation manner of the serial digital interface according to the pixel difference values. Each group of reference pixel points includes a plurality of pixel points, and the set extraction manner is to extract at least two columns or at least two rows of pixel points at a connecting position of every two sub-images that are connected, or extract a plurality of pixel points in a same region in the four sub-images.

In some embodiments, in a case where the set extraction manner is to extract at least two columns or at least two rows of pixel points at the connecting position of every two sub-images that are connected, the two sub-images that are connected are a first sub-image and a second sub-image, the first sub-image includes a plurality of first pixel points, and the second sub-image includes a plurality of second pixel points.

For a first sub-image and a second sub-image that are connected in a row direction, an extracted group of reference pixel points includes: at least one column of first pixel points of the first sub-image at a connecting position where the first sub-image and the second sub-image are connected in the row direction, and at least one column of second pixel points of the second sub-image at the connecting position where the first sub-image and the second sub-image are connected in the row direction.

For a first sub-image and a second sub-image that are connected in a column direction, an extracted group of reference pixel points includes: at least one row of first pixel points of the first sub-image at a connecting position where the first sub-image and the second sub-image are connected in the column direction, and at least one row of second pixel points of the second sub-image at the connecting position where the first sub-image and the second sub-image are connected in the column direction.

In some embodiments, for the first sub-image and the second sub-image that are connected in the row direction, a group of reference pixel points includes a column of first pixel points and a column of second pixel points; for the first sub-image and the second sub-image that are connected in the column direction, a group of reference pixel points includes a row of first pixel points and a row of second pixel points.

For the first sub-image and the second sub-image that are connected in the row direction, calculating the pixel difference values of pixel points according to the four groups of reference pixel points includes: calculating a pixel gradient value between two pixel points in a same row in a column of first pixel points and a column of second pixel points included in each group of reference pixel points; and calculating an average value of pixel gradient values according to pixel gradient values of the column of first pixel points and the column of second pixel points, and considering the average value as a pixel difference value of the group of reference pixel points.

For the first sub-image and the second sub-image that are connected in the column direction, calculating the pixel difference values of pixel points according to the four groups of reference pixel points includes: calculating a pixel gradient value between two pixel points in a same column in a row of first pixel points and a row of second pixel points included in each group of reference pixel points; and calculating an average value of pixel gradient values of the row of first pixel points and the row of second pixel points, and considering the average value as a pixel difference value of the group of reference pixel points.

In some embodiments, a pixel point of each sub-image includes sub-pixels with at least two colors. Calculating the pixel gradient value between the two pixel points in the same row in the column of first pixel points and the column of second pixel points included in each group of reference pixel points includes: calculating a gray scale difference value between sub-pixels with a same color in the two pixel points in the same row; and calculating an average value of gray scale difference values of sub-pixels of the two pixel points in the same row, and considering the average value as the pixel gradient value between the two pixel points in the same row.

Calculating the pixel gradient value between the two pixels in the same column in the row of first pixel points and the row of second pixel points included in each group of reference pixel points includes: calculating a gray scale difference value between sub-pixels with a same color in the two pixel points in the same column; and calculating an average value of gray scale difference values of sub-pixels of the two pixel points in the same column, and considering the average value as the pixel gradient value between the two pixel points in the same column.

In some embodiments, determining the image segmentation manner of the serial digital interface according to the pixel difference values includes: determining whether a pixel difference value of each group of reference pixel points is less than or equal to a first set threshold value; and if yes, determining that the image segmentation manner of the serial digital interface is a square division (SQD) image segmentation manner.

In some embodiments, the detection method further includes: if at least one of pixel difference values of groups of reference pixel points exceeds the first set threshold value, determining that the image segmentation manner of the serial digital interface is a 2 sample interleave (2SI) image segmentation manner.

In some embodiments, the detection method further includes: if at least one of pixel difference values of groups of reference pixel points exceeds the first set threshold value, determining whether the image segmentation manner of the serial digital interface is a 2SI image segmentation manner.

In some embodiments, in a case where the set extraction manner is to extract a plurality of pixel points in a same region in the four sub-images, calculating the pixel difference values of pixel points according to the four groups of reference pixel points includes: calculating a pixel difference value between pixel points at a same position of every two groups of reference pixel points in the four groups of reference pixel points; and calculating an average value of pixel difference values of every two groups of reference pixel points, and considering the average value as a pixel difference value between two groups of reference pixel points.

In some embodiments, a pixel point of each sub-image includes sub-pixels with at least two colors. Calculating the pixel difference value between pixel points at the same position of every two groups of reference pixel points in the four groups of reference pixel points includes: calculating a gray scale difference value between sub-pixels with a same color in the pixel points at the same position of every two groups of reference pixel points; and calculating an average value of gray scale difference values of sub-pixels with the same color, and considering the average value as a pixel difference value between pixel points at the same position of two groups of reference pixel points.

In some embodiments, determining the image segmentation manner of the serial digital interface according to the pixel difference values includes: determining whether a pixel difference value between every two groups of reference pixel points is less than or equal to a second set threshold value; and if yes, determining that the image segmentation manner of the serial digital interface is a 2SI image segmentation manner.

In some embodiments, the detection method further includes: if at least one of the pixel difference values of every two groups of reference pixel points exceeds the second set threshold value, determining that the image segmentation manner of the serial digital interface is an SQD image segmentation manner.

In some embodiments, the detection method further includes: if at least one of the pixel difference values of every two groups of reference pixel points exceeds the second set threshold value, determining whether the image segmentation manner of the serial digital interface is an SQD image segmentation manner.

In another aspect, a detection device for an image segmentation manner is provided. The detection device includes a row and column count module, an SQD determining module and a 2SI determining module. The row and column count module is coupled to a serial digital interface, and the row and column count module is configured to count rows and columns of pixels of four sub-images input by the serial digital interface and formed by dividing an original image. The SQD determining module is coupled to the row and column count module, and the SQD determining module is configured to determine whether an image segmentation manner of the serial digital interface is an SQD image segmentation manner according to pixel points at a connecting position of every two sub-images in the four sub-images that are connected. The 2SI determining module is coupled to the row and column count module, and the 2SI determining module is configured to determine whether the image segmentation manner of the serial digital interface is a 2SI image segmentation manner according to pixel points in a same region in the four sub-images.

In some embodiments, the SQD determining module includes an SQD pixel extracting unit, an SQD difference calculating unit and an SQD determining unit. The SQD pixel extracting unit is configured to extract at least two columns or at least two rows of pixel points at the connecting position of every two sub-images that are connected to obtain four groups of reference pixel points. The SQD difference calculating unit is configured to calculate a pixel difference value of each group of reference pixel points. The SQD determining unit is configured to determine whether the image segmentation manner of the serial digital interface is the SQD image segmentation manner according to pixel difference values.

In some embodiments, the 2SI determining module includes a 2SI pixel extracting unit, a 2SI difference calculating unit, and a 2SI determining unit. The 2SI pixel extracting unit is configured to extract a plurality of pixel points in a same region in the four sub-images to obtain four groups of reference pixel points. The 2SI difference calculating unit is configured to calculate a pixel difference value between every two groups of pixel points. The 2SI determining unit is configured to determine whether the image segmentation manner of the serial digital interface is the 2SI image segmentation manner according to pixel difference values.

In yet another aspect, a display device is provided. The display device includes a display screen, a first circuit board coupled to the display screen, a second circuit board coupled to the first circuit board and a serial digital interface disposed on the second circuit board.

The second circuit board is provided with the detection device for the image segmentation manner according to some of the above embodiments, and the detection device is coupled to the serial digital interface.

In yet another aspect, a non-transitory computer-readable storage medium is provided. The non-transitory computer-readable storage medium stores computer program instructions. When the computer program instructions run on a processor, the processor executes one or more steps in the detection method for the image segmentation manner described in some of the above embodiments.

In yet another aspect, a computer program product is provided. The computer program product includes computer program instructions that are stored in a non-transitory computer-readable storage medium. When the computer program instructions are executed on a computer, the computer program instructions causes the computer to execute one or more steps in the detection method for the image segmentation manner described in some of the above embodiments.

In yet another aspect, a computer program is provided. When the computer program is executed on a computer, the computer program causes the computer to execute one or more steps in the detection method for the image segmentation manner described in some of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal involved in the embodiments of the present disclosure.

DETAILED DESCRIPTION

Figure 1:
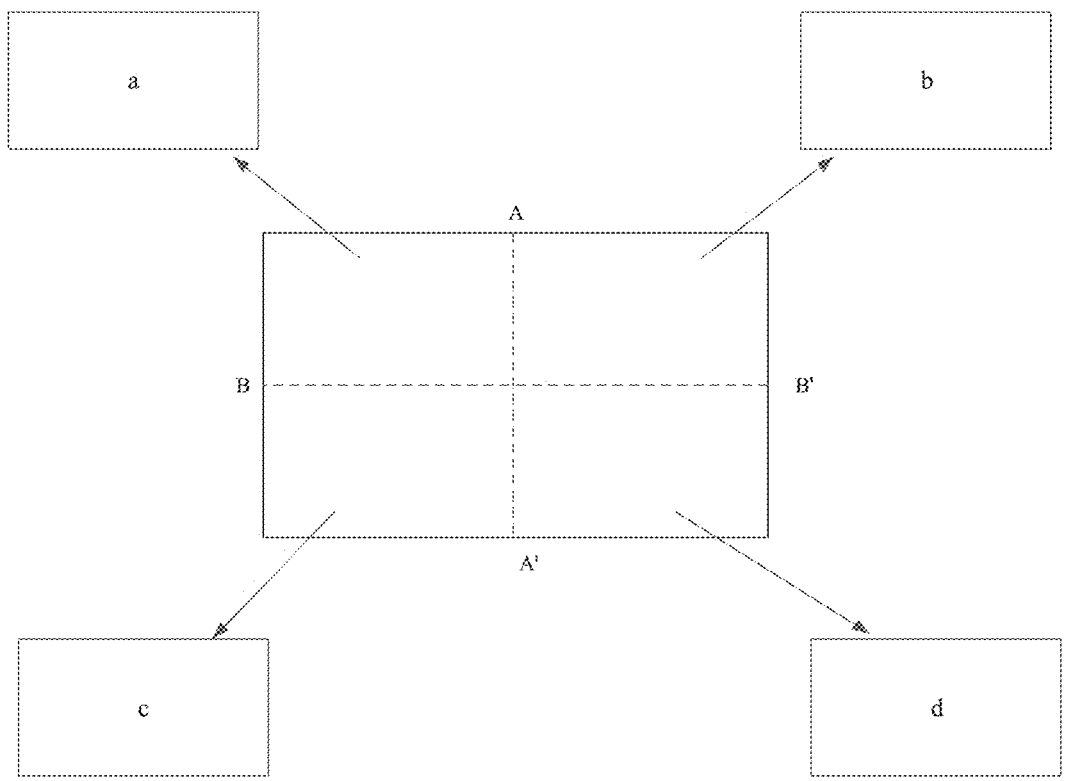
FIG. 1 is a diagram illustrating a segmentation principle of an image segmentation manner of square division (SQD)

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials, or characteristics may be included in any one or more embodiments or examples in any suitable manner.

Hereinafter, the terms "first", "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the related art, after a display receives sub-images from a serial digital interface, the display splices the sub-images to obtain a complete image according to a segmentation manner of the sub-images, and then displays it through a display screen. At present, image segmentation manners adopted by the serial digital interface include 2 sample interleave (2SI) and square division (SQD). However, at present, the display cannot automatically determine the image segmentation manner of the serial digital interface, and a user needs to manually select the segmentation manner through an interactive interface, which reduces user experience.

In order to describe following embodiments clearly and concisely, some terms involved in the present disclosure will be briefly introduced first.

A pixel point, which is also referred to as a pixel, is the smallest unit that constitutes an image. Each pixel point has a definite position, and the position is determined by a row coordinate and a column coordinate of the pixel point. Each pixel point may include at least three sub-pixels with different colors. For example, it may include one red sub-pixel, one green sub-pixel, and one blue sub-pixel (i.e., an RGB array), or it may also include one red sub-pixel, two green sub-pixels, and one blue sub-pixel (i.e., an RGBG array). Each sub-pixel may show different luminance levels; for example, it may include 256 luminance levels. The pixel points may show different colors through a combination of sub-pixels that have different luminance levels. The luminance level of the sub-pixel is the so-called gray scale value.

Figure 2:
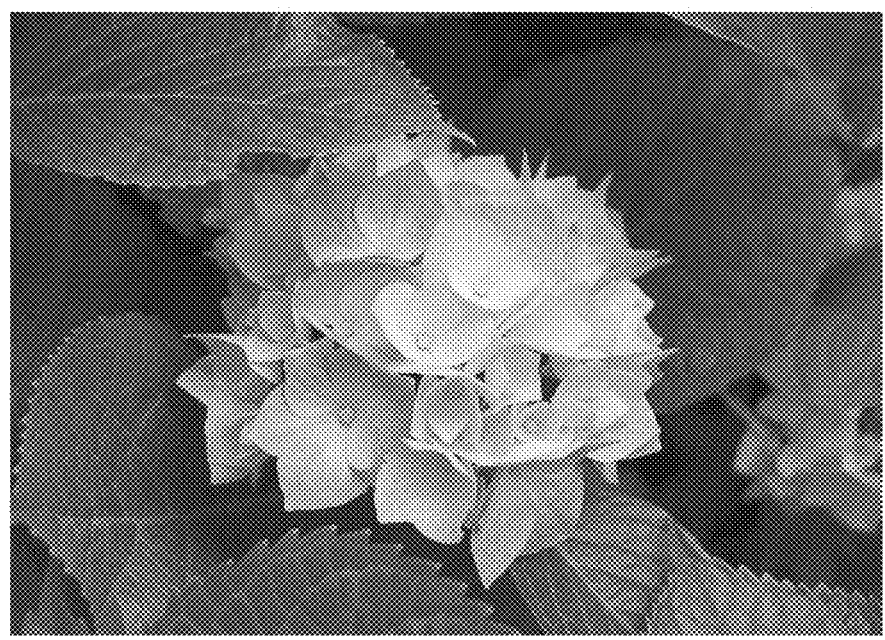
FIG. 2 is a diagram illustrating an example of an original image.
Figure 3:
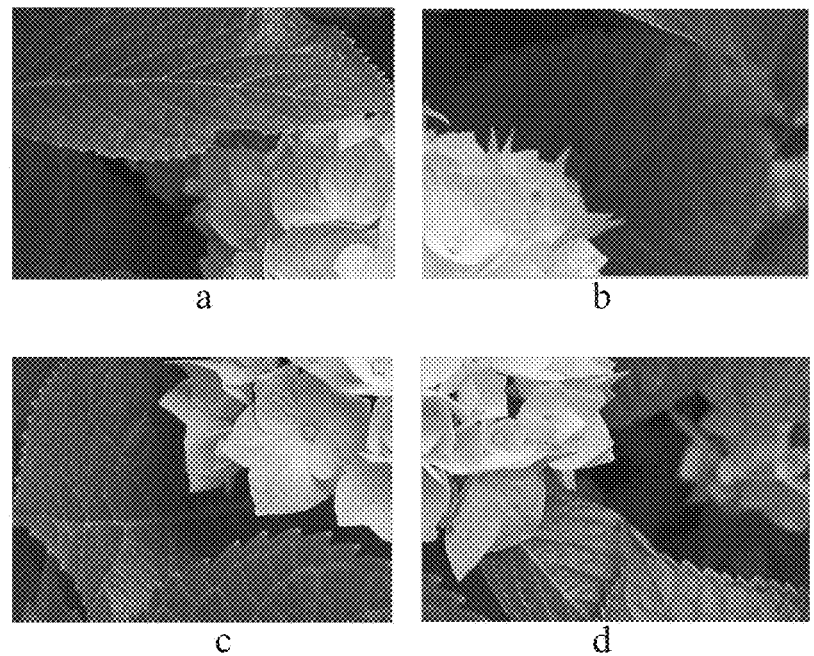
FIG. 3 is a diagram illustrating four sub-images obtained by an SQD image segmentation manner.

SQD segmentation manner: FIG. 1 is a diagram illustrating the principle of the segmentation manner of SQD. Referring to FIG. 1, in the SQD segmentation manner, a perpendicular centerline AA' and a horizontal centerline BB' of an original image are considered as a perpendicular dividing line and a horizontal dividing line, and the original image is quartered into four sub-images—a, b, c, and d. The sub-image a is connected to the sub-image b and the sub-image c, and the sub-image d is also connected to the sub-image b and the sub-image c. For example, an image shown in FIG. 2 is considered as the original image, and as shown in FIG. 3, the image is divided into four sub-images—a, b, c, and d through the SQD segmentation manner. Referring to FIGS. 1 and 3, it will be found that, two sub-images that are connected are located at opposite sides of a dividing line, and pixel points at a connecting position are adjacent pixel points, and a color difference thereof is small. Therefore, if the color difference of the pixel points at edges (i.e., the connecting position) of the four sub-images transmitted by the serial digital interface is small, it may be determined that the image segmentation manner is SQD.

Figure 4:
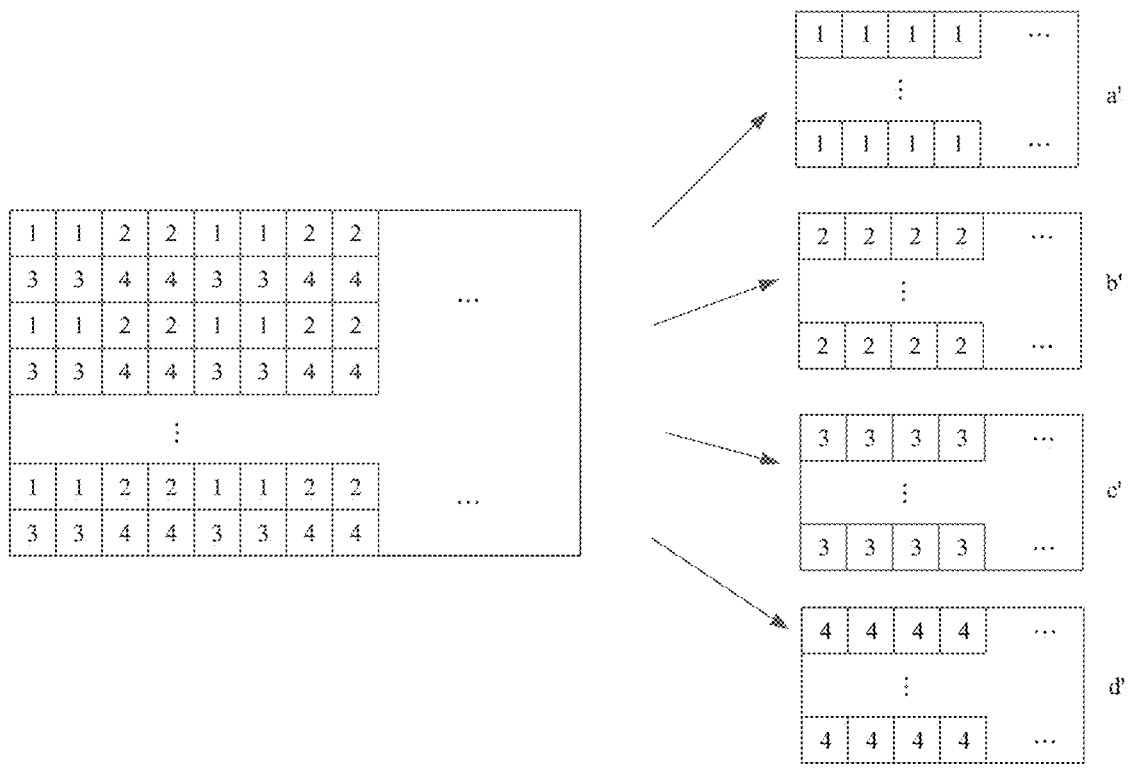
FIG. 4 is a diagram illustrating a segmentation principle of an image segmentation manner of 2 sample interleave (2SI)
Figure 5:
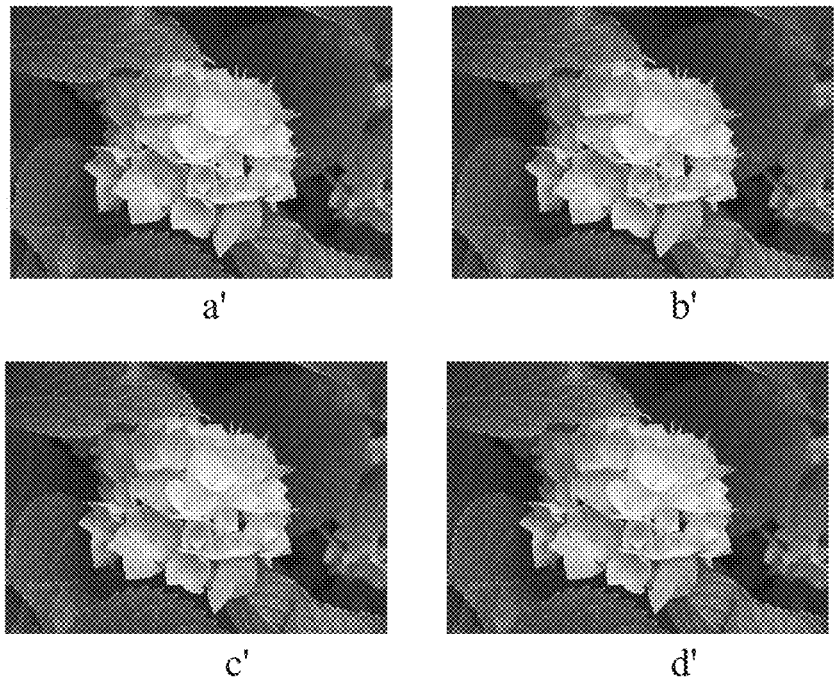
FIG. 5 is a diagram illustrating four sub-images obtained by a 2SI image segmentation manner.

2SI segmentation manner: the original image is divided into four sub-images through uniform extracting method. Referring to the diagram illustrating the segmentation principle of 2SI segmentation manner shown in FIG. 4, for example, according to a marking manner shown in FIG. 4, take two pixel points as a unit for the uniform extracting method, and sample points with a same mark constitute a sub-image. That is, sample points marked as 1 form a sub-image a', sample points marked as 2 form a sub-image b', sample points marked as 3 form a sub-image c', and sample points marked as 4 form a sub-image d'. For example, the image shown in FIG. 2 is still considered as the original image, and the four sub-images a', b', c', and d' obtained by dividing the original image through the 2SI segmentation manner are shown in FIG. 5. Referring to FIGS. 4 and 5, it may be found that, each sub-image obtained through the 2SI segmentation manner is derived from the original image through the uniform extracting method; it can be considered that each sub-image is a scaled-down version of the original image, and the color difference of the pixel points at a same position of the four sub-images is small. Therefore, if the color difference of the pixel points at the same position of the four sub-images transmitted by the serial digital interface is small, it can be determined that the image segmentation manner is 2SI.

In the two segmentation manners, four sub-images are obtained, and the four sub-images are input to the display through four transmission channels of the serial digital interface. There is a corresponding relationship between the four sub-images and the four transmission channels, and the display stores the corresponding relationship. The display may determine a display position of a sub-image in the display screen according to the corresponding relationship, and then determine a positional relationship among the sub-images input through the four transmission channels.

In an example where the four transmission channels of the serial digital interface are a first channel, a second channel, a third channel and a fourth channel, and the segmentation manner is the SQD segmentation manner, the corresponding relationship between the four transmission channels and the four sub-images may be that: the sub-image a is input through the first channel, the sub-image b is input through the second channel, the sub-image c is input through the third channel, and the sub-image d is input through the fourth channel. In other words, the sub-image input through the first channel to the display will be displayed in an upper left region of the display screen, the sub-image input through the second channel to the display will be displayed in an upper right region of the display screen, the sub-image input through the third channel to the display will be displayed in a lower left region of the display screen, and the sub-image input through the fourth channel to the display will be displayed in a lower right region of the display screen.

On this basis, a detection method for the image segmentation manner provided by some embodiments of the present disclosure will be specifically described below.

Figure 6:
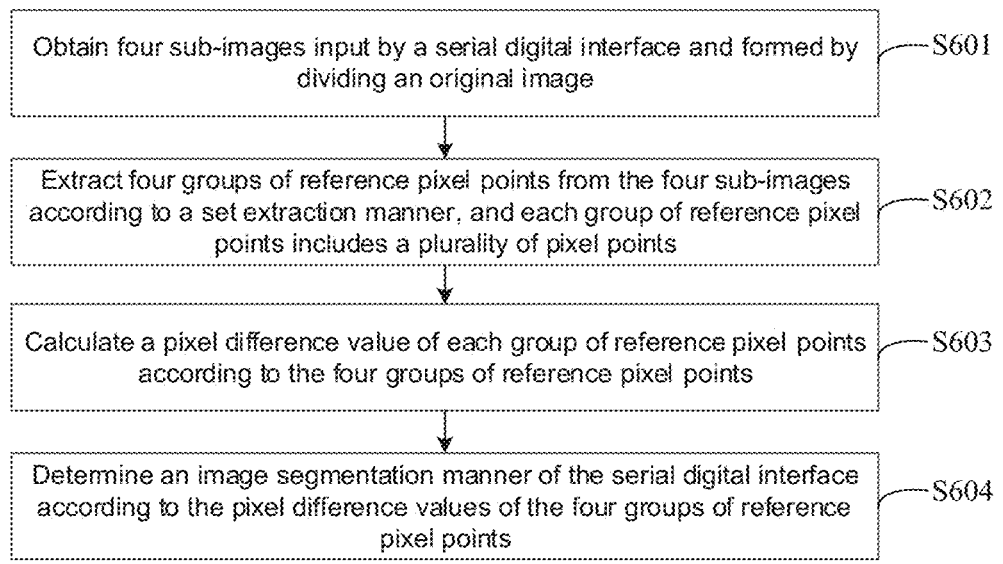
FIG. 6 is a flow diagram of a detection method for an image segmentation manner, in accordance with some embodiments.

FIG. 6 is a flow diagram of a detection method for the image segmentation manner provided by some embodiments of the present disclosure, and the method may be applied to a display device. Referring to FIG. 6, the detection method includes the following steps.

In S601, four sub-images input through a serial digital interface and divided from an original image are obtained.

The four sub-images divided from the original image may be obtained from four transmission channels of the serial digital interface.

In S602, four groups of reference pixel points are extracted from the four sub-images according to a set extraction manner, and each group of reference pixel points includes a plurality of pixel points.

The set extraction manner may be set to extract at least two columns or at least two rows of pixel points at a connecting position of every two sub-images that are connected.

As mentioned above, according to the corresponding relationship between the sub-images and the transmission channels, it is possible to determine which of the sub-images input from the four transmission channels of the serial digital interface are the sub-images that are connected. For example, it is assumed that the four transmission channels are a first channel, a second channel, a third channel and a fourth channel, and the corresponding relationship between the four transmission channels and the four sub-images is as shown in the previous example; then the sub-image input from the first channel and the sub-image input from the second channel are sub-images that are connected, the sub-image input from the first channel and the sub-image input from the third channel are sub-images that are connected, the sub-image input from the second channel and the sub-image input from the fourth channel are sub-images that are connected, and the sub-image input from the third channel and the sub-image input from the fourth channel are sub-images that are connected.

In the embodiments of the present disclosure, two sub-images that are connected are referred to as a first sub-image and a second sub-image. The first sub-image includes a plurality of first pixel points, the second sub-image includes a plurality of second pixel points, and the first sub-image and the second sub-image are connected in a row direction or a column direction. It will be understood that, in a case where the first sub-image and the second sub-image are connected in the row direction, the first sub-image and the second sub-image are respectively located at a left side and a right side of the perpendicular dividing line (i.e., the perpendicular centerline AA' in FIG. 1). For example, the sub-image a and the sub-image b in FIG. 1 are connected in the row direction. Similarly, in a case where the first sub-image and the second sub-image are connected in the column direction, the first sub-image and the second sub-image are respectively located at an upper side and a lower side of the horizontal dividing line (i.e., the horizontal centerline BB' in FIG. 1). For example, the sub-image a and the sub-image c in FIG. 1 are connected in the column direction.

For the first sub-image and the second sub-image that are connected in the row direction, a group of reference pixel points extracted according to the set extraction manner includes: at least one column of first pixel points of the first sub-image at the connecting position where the two sub-images are connected, and at least one column of second pixel points of the second sub-image at the connecting position where the two sub-images are connected.

Figure 7A:
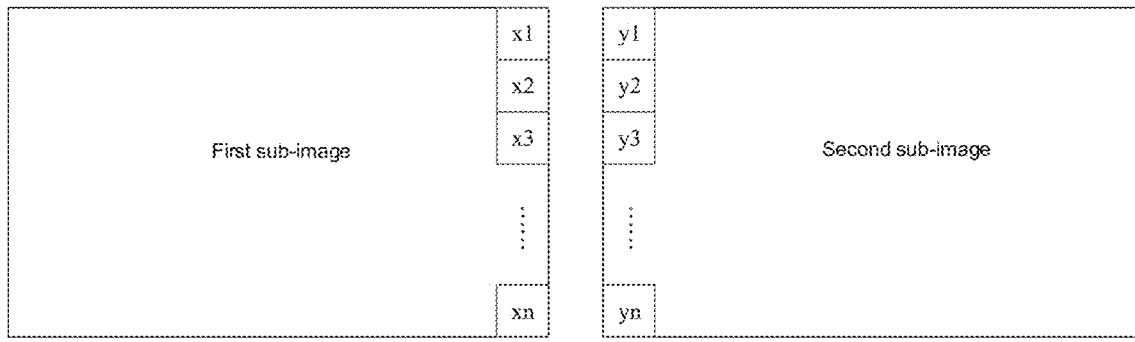
FIG. 7A is a diagram illustrating an example of a first sub-image and a second sub-image that are connected in a row direction.

It will be understood that, for the first sub-image and the second sub-image that are connected in the row direction, as shown in FIG. 7A, in a case where the first sub-image is an image at the left side of the perpendicular dividing line, and the second sub-image is an image at the right side of the perpendicular dividing line, the at least one column of first pixel points of the first sub-image at the connecting position where the two sub-images are connected refers to last few columns of pixel points of the first sub-image. Similarly, the at least one column of second pixel points of the second sub-image at the connecting position where the two sub-images are connected refers to first few columns of pixel points of the second sub-image.

In some embodiments, for the first sub-image and the second sub-image that are connected in the row direction, a group of reference pixel points includes one column of first pixel points and one column of second pixel points. For example, with continued reference to FIG. 7A, it is assumed that the last column of first pixel points of the first sub-image are [x1, x2, x3, . . . , xn]$^T$, and the first column of second pixel points of the second sub-image are [y1, y2, y3, . . . , yn]$^T$ (n represents the number of first pixel points and the number of second pixel points), and then a group of reference pixel points extracted according to the set extraction manner may be composed of the last column of first pixel points and the first column of second pixel points, which is as shown below:

$$\begin{bmatrix} x1 & y1 \\ x2 & y2 \\ x3 & y3 \\ \vdots & \vdots \\ xn & yn \end{bmatrix}.$$

For a first sub-image and a second sub-image that are connected in a column direction, an extracted group of reference pixel points includes: at least one row of first pixel points of the first sub-image at a connecting position where the two sub-images are connected, and at least one row of second pixel points of the second sub-image at the connecting position where the two sub-images are connected.

Figure 7B:
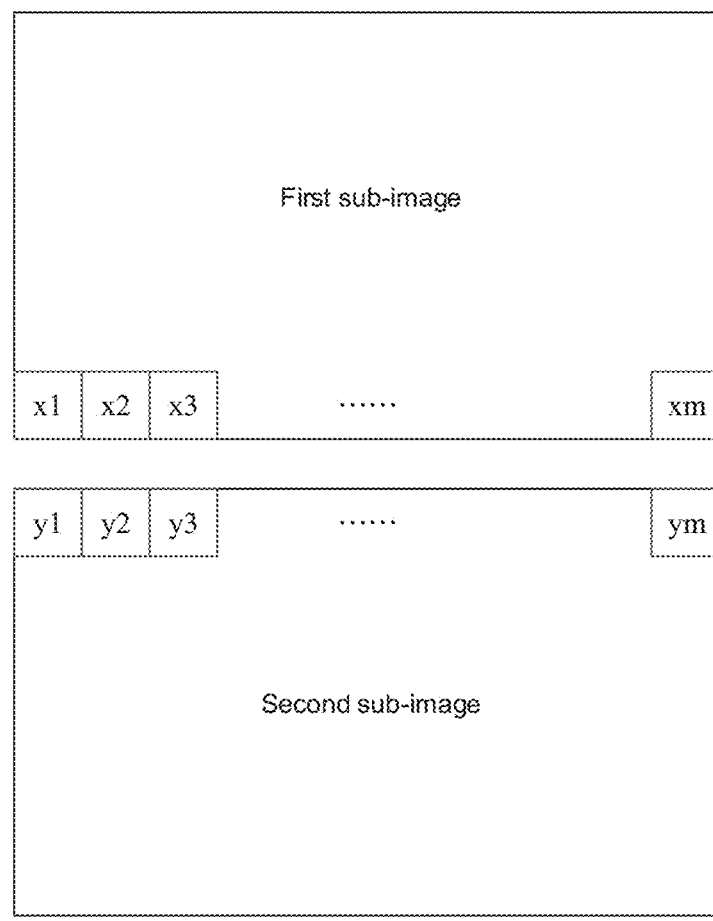
FIG. 7B is a diagram illustrating an example of a first sub-image and a second sub-image that are connected in a column direction.

It will be understood that, for the first sub-image and the second sub-image that are connected in the column direction, as shown in FIG. 7B, in a case where the first sub-image is an image at the upper side of the horizontal dividing line and the second sub-image is an image at the lower side of the horizontal dividing line, the at least one row of first pixel points of the first sub-image at the connecting position where the two sub-images are connected refers to last few rows of pixel points of the first sub-image. Similarly, the at least one row of second pixel points of the second sub-image at the connecting position where the two sub-images are connected refers to first few rows of pixel points of the second sub-image.

In some embodiments, for the first sub-image and the second sub-image that are connected in the column direction, a group of reference pixel points includes one row of first pixel points and one row of second pixel points. For example, with continued reference to FIG. 7B, it is assumed that the last row of first pixel points of the first sub-image are [x1, x2, x3, . . . , xm], and the first row of second pixel points of the second sub-image are [y1, y2, y3, . . . , ym], (m represents the number of first pixel points and second pixel points), and then a group of reference pixel points extracted according to the set extraction manner may be composed of the last row of first pixel points and the first row of second pixel points, which is as shown below:

$$\begin{bmatrix} x1 & x2 & x3 & \ldots & xm \\ y1 & y2 & y3 & \ldots & ym \end{bmatrix}.$$

In S603, according to four groups of reference pixel points, a pixel difference value of each group of reference pixel points is calculated.

In some embodiments, for the first sub-image and the second sub-image that are connected in the row direction, in a case where a corresponding group of reference pixel points includes one column of first pixel points and one column of second pixel points, calculating the pixel difference value of each group of reference pixel points includes:

(1) calculating a pixel gradient value between two pixel points in a same row which are in a column of first pixel points and a column of second pixel points included in each group of reference pixel points; and (2) calculating an average value of pixel gradient values according to pixel gradient values of the column of first pixel points and the column of second pixel points, and considering the average value as the pixel difference value of the group of reference pixel points.

For example, following the previous example, it is assumed that the group of reference pixel points may be expressed as:

$$\begin{bmatrix} x1 & y1 \\ x2 & y2 \\ x3 & y3 \\ \vdots & \vdots \\ xn & yn \end{bmatrix},$$

and then calculating the pixel difference value of the group of reference pixel points includes:

(1) calculating a pixel gradient value between a first pixel point and a second pixel point in the same row, i.e., calculating the pixel gradient values of x1 and y1, x2 and y2, x3 and y3, . . . , and xn and yn, which may be expressed as G1, G2, G3, . . . , and Gn; and (2) calculating an average value of the pixel gradient values of x1 and y1, x2 and y2, x3 and y3, . . . , and xn and yn, i.e., calculating an average value of G1, G2, G3, . . . , and Gn.

Therefore, the pixel difference value of the group of reference pixel points may be expressed as G is equal to (G1+G2+ . . . +Gn)/n (G=(G1+G2+ . . . +Gn)/n).

The pixel point of each sub-image includes sub-pixels with at least two colors. For example, the pixel point of each sub-image includes a red sub-pixel, a green sub-pixel, and a blue sub-pixel. In some embodiments, calculating a pixel gradient value between two pixel points in a same row which are in a column of first pixel points and a column of second pixel points included in each group of reference pixel points, includes:

(1A) calculating gray scale difference values of sub-pixels with a same color of two pixel points in the same row; and (1B) calculating an average value of gray scale difference values of sub-pixels of two pixel points in the same row, and considering the average value as the pixel gradient value between the two pixel points in the same row. The gray scale difference value is a difference value of gray scale values.

For example, following the previous example, a first pixel point x1 and a second pixel point y1 in the same row are considered as an example. It is assumed that each pixel includes a red sub-pixel, a green sub-pixel and a blue sub-pixel, and then gray scale difference values of sub-pixels with a same color in x1 and y1 are calculated. That is, a gray scale difference value between red sub-pixels of x1 and y1, a gray scale difference value between green sub-pixels of x1 and y1 and a gray scale difference value between blue sub-pixels of x1 and y1 are calculated firstly; for example, the gray scale difference values may be denoted as $G1_r$, $G1_g$, $G1_b$. Further, an average value of the gray scale difference values of the sub-pixels of x1 and y1 is calculated. That is, an average value of $G1_r$, $G1_g$, and $G1_b$ is calculated. Therefore, a pixel gradient value between x1 and y1 may be expressed as G1 is equal to $(G1_r+G1_g+G1_b)/3$ $(G1=(G1_r+G1_g+G1_b)/3)$.

Similarly, gray scale difference values of sub-pixels with a same color in xi and yi are calculated. That is, a gray scale difference value between red sub-pixels of xi and yi, a gray scale difference value between green sub-pixels of xi and yi and a gray scale difference value between blue sub-pixels of xi and yi are calculated firstly; for example, the gray scale difference values may be denoted as $Gi_r$, $Gi_g$, $Gi_b$. Further, an average value of the gray scale difference values of sub-pixels of xi and yi is calculated. That is, an average value of $Gi_r$, $Gi_g$ and $Gi_b$ is calculated. Therefore, a pixel gradient value between xi and yi may be expressed as Gi is equal to $(Gi_r+Gi_g+Gi_b)/3$ $(Gi=(Gi_r+Gi_g+Gi_b)/3)$.

In some embodiments, for the first sub-image and the second sub-image that are connected in the column direction, in a case where a corresponding group of reference pixel points includes one row of first pixel points and one row of second pixel points, calculating the pixel difference value of each group of reference pixel points includes:

(1) calculating a pixel gradient value between two pixel points in a same column which are in a row of first pixel points and a row of second pixel points included in each group of reference pixel points; and (2) calculating an average value of pixel gradient values according to pixel gradient values of the row of first pixel points and the row of second pixel points, and considering the average value as the pixel difference value of the group of reference pixel points.

For example, following the previous example, it is assumed that the group of reference pixel points may be expressed as:

$$\begin{bmatrix} x1 & x2 & x3 & \ldots & xm \\ y1 & y2 & y3 & \ldots & ym \end{bmatrix},$$

and then calculating the pixel difference value of the group of reference pixel points includes:

(1) calculating a pixel gradient value between a first pixel point and a second pixel point in the same column, i.e., calculating the pixel gradient values of x1 and y1, x2 and y2, x3 and y3, . . . , and xm and ym, which may be expressed as G1, G2, G3, . . . , and Gm; and (2) calculating an average value of the pixel gradient values of x1 and y1, x2 and y2, x3 and y3, . . . , and xm and ym, i.e., calculating an average value of G1, G2, G3, . . . , and Gm.

Therefore, the pixel difference value of the group of reference pixel points may be expressed as G is equal to $(G1+G2+ \ldots +Gm)/m$ $(G=(G1+G2+ \ldots +Gm)/m)$.

In some embodiments, calculating a pixel gradient value between two pixel points in a same column which are in a row of first pixel points and a row of second pixel points included in each group of reference pixel points, includes:

(1) calculating gray scale difference values of sub-pixels with a same color of two pixel points in the same column; and (2) calculating an average value of gray scale difference values of sub-pixels of two pixel points in the same column, and considering the average value as the pixel gradient value between the two pixel points in the same column.

A calculating process of the pixel gradient value between two pixel points in the same column may be referred to the example given in the previous embodiments where the pixel gradient value between two pixel points in the same row is calculated, which will not be repeated here.

In some embodiments, for a group of reference pixel points (for convenience of description, it is referred to as a first reference pixel point group subsequently) including multiple columns of first pixel points and multiple columns of second pixel points, a difference between a calculating process of a pixel difference value of the group of reference pixel points and a calculating process of the above group of reference pixel points (for convenience of description, it is referred to as a second reference pixel point group subsequently) including one column of first pixel points and one column of second pixel points is that: in a case where a pixel gradient value between a first pixel point and a second pixel point included in the first reference pixel point group in step (1) is calculated, it may be calculating a pixel gradient value between any first pixel point and any second pixel point in the same row. In principle, all first pixel points and second pixel points should be included when the pixel gradient values are calculated.

For example, in a case where the first reference pixel point group includes three columns of first pixel points and three columns of second pixel points, pixel gradient values between the first pixel points and the second pixel points in a same row in the first column of first pixel points and the first column of second pixel points, in the second column of first pixel points and the second column of second pixel points, and in the third column of first pixel points and the third column of second pixel points of the first reference pixel point group may be calculated, or, pixel gradient values between the first pixel points and the second pixel points in a same row in the first column of first pixel points and the second column of second pixel points, in the second column of first pixel points and the third column of second pixel points, and in the third column of first pixel points and the first column of second pixel points of the first reference pixel point group may also be calculated.

For another example, in a case where the first reference pixel point group includes three columns of first pixel points and two columns of second pixel points, a pixel gradient value between a first pixel point and a second pixel point in a same row in a first column of first pixel points and a first column of second pixel points, in a second column of first pixel points and a second column of second pixel points and in a third column of first pixel points and the second column of second pixel points of the first reference pixel point group may be calculated; or, a pixel gradient value between a first pixel point and a second pixel point in a same row in the first column of first pixel points and the second column of second pixel points, in the second column of first pixel points and the first column of second pixel points and in the third column of first pixel points and the first column of second pixel points of the first reference pixel point group may also be calculated; and so on.

Similarly, for a group of reference pixel points including multiple rows of first pixel points and multiple rows of second pixel points, it may also be processed in accordance with the above manner, which will not be repeated here.

In S604, the image segmentation manner of the serial digital interface is determined according to the pixel difference values of the four groups of reference pixel points.

Figure 8:
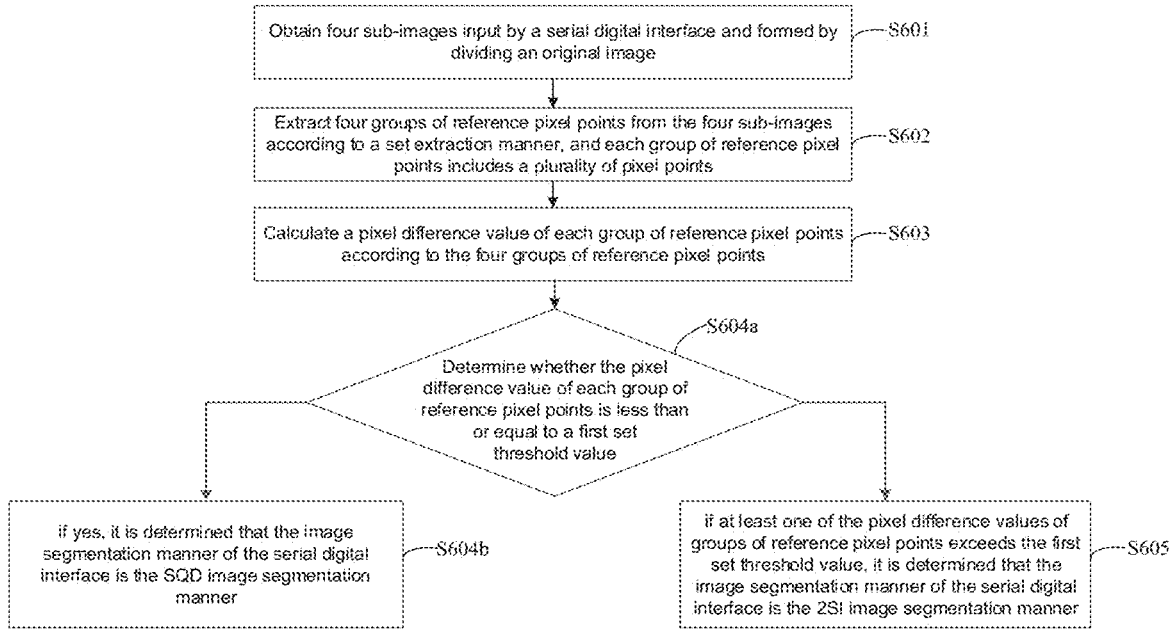
FIG. 8 is a flow diagram of a detection method for another image segmentation manner, in accordance with some embodiments.

In some embodiments, as shown in FIG. 8, determining the image segmentation manner of the serial digital interface (i.e., the step of S604) according to the pixel difference values of the four groups of reference pixel points includes the following sub-steps.

In S604a, whether the pixel difference value of each group of reference pixel points is less than or equal to a first set threshold value is determined.

The first set threshold value may be used to determine a degree of the color difference between the first pixel point and the second pixel point in the same row or the same column in a group of reference pixel points. If a pixel difference value of a certain group of reference pixel points is less than or equal to the first set threshold value, it means that the color difference between the first pixel point and the second pixel point in the same row or the same column in the group of reference pixel points is small. Conversely, if the pixel difference value of a certain group of reference pixel points is greater than the first set threshold value, it means that the color difference between the first pixel point and the second pixel point in the same row or the same column in the group of reference pixel points is large.

With respect to a selection of the first set threshold value, the first set threshold value may be obtained by training a large amount of different types of images in advance. For example, some sample images may be selected, and these sample images are divided according to the SQD image segmentation manner; four groups of reference pixel points are extracted from four sub-images obtained by dividing; the pixel difference value of each group of reference pixel points is calculated, and a distribution of all pixel difference values is counted. As a result, the first set threshold value is determined according to the distribution. For example, in a case where more than ninety-five percent of the pixel difference values are within a certain range of a certain threshold value, the threshold value may be set as the first set threshold value.

In S604b, if yes, it is determined that the image segmentation manner of the serial digital interface is the SQD image segmentation manner.

It will be understood that, if the pixel difference values of the four groups of reference pixel points are all less than or equal to the first set threshold value, it means that the color difference between the first pixel point and the second pixel point in the same row or the same column in each group of reference pixel points is small. That is, the color difference of pixel points at the edges of the four sub-images transmitted by the serial digital interface is small, which further shows that the four sub-images are obtained by dividing the original image through the SQD image segmentation manner. In other words, the image segmentation manner of the serial digital interface is the SQD image segmentation manner.

In some embodiments, as shown in FIG. 8, the detection method further includes the following step.

In S605, if at least one of the pixel difference values of groups of reference pixel points exceeds the first set threshold value, it is determined that the image segmentation manner of the serial digital interface is the 2SI image segmentation manner.

That is, in a case where pixel difference values of one or more groups of reference pixel points in the four groups of reference pixel points are greater than the first set threshold value, it is determined that the image segmentation manner of the serial digital interface is the 2SI image segmentation manner. Because in a case where pixel difference values of one or more groups of reference pixel points in the four groups of reference pixel points are greater than the first set threshold value, it means that the color difference of pixel points at the edges of the four sub-images (i.e., at the connecting positions) is large, which does not accord with the characteristics of the SQD image segmentation manner. Moreover, the image segmentation manner of the serial digital interface is usually the SQD and the 2SI. Therefore, it may be determined that the image segmentation manner of the serial digital interface is the 2SI image segmentation manner.

Figure 9:
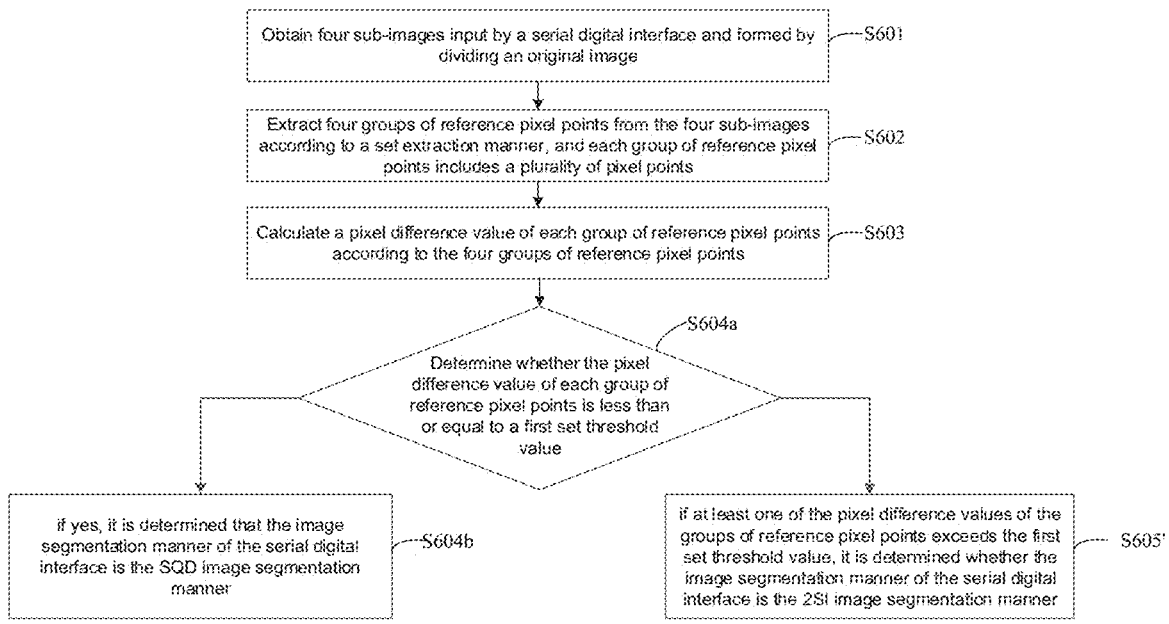
FIG. 9 is a flow diagram of a detection method for yet another image segmentation manner, in accordance with some embodiments.

In some embodiments, as shown in FIG. 9, the detection method further includes the following step.

In S605', if at least one of the pixel difference values of the groups of reference pixel points exceeds the first set threshold value, it is determined whether the image segmentation manner of the serial digital interface is the 2SI image segmentation manner.

That is, after determining that the image segmentation manner of the serial digital interface is not the SQD image segmentation manner, it may be further determined whether the image segmentation manner of the serial digital interface is the 2SI image segmentation manner. Based on this solution, it may be possible to avoid a problem of an inaccurate detection result caused by an error in a determining process of the SQD image segmentation manner, and thus ensure the reliability of the detection result.

Figure 10:
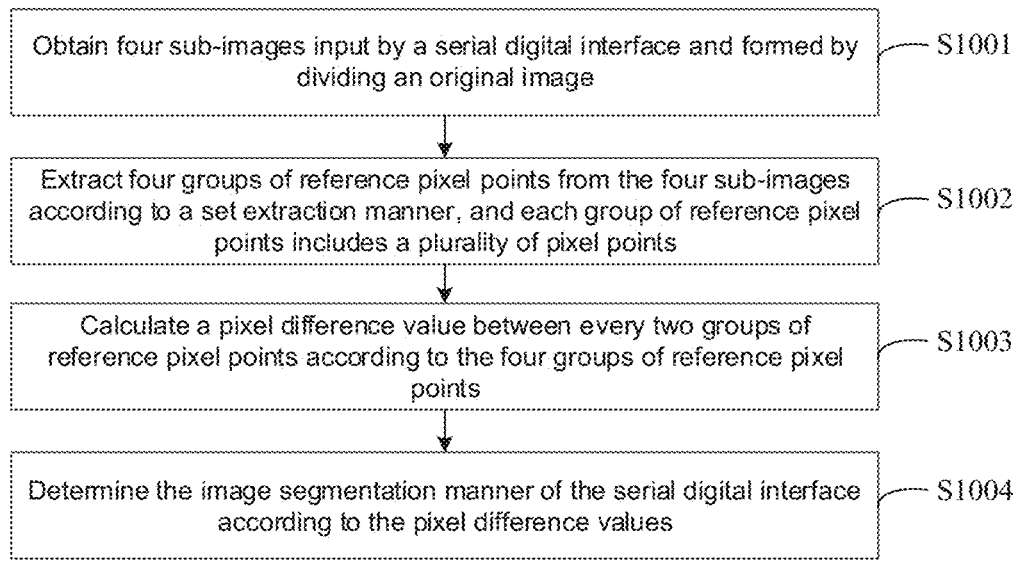
FIG. 10 is a flow diagram of a detection method for yet another image segmentation manner, in accordance with some embodiments.

A solution for determining whether the image segmentation manner of the serial digital interface is the 2SI image segmentation manner may be referred to the related description in the embodiment as shown in FIG. 10, which will not be introduced here.

In the embodiments of the present disclosure, the display device may obtain the four sub-images input by the serial digital interface and formed by dividing the original image, and extract four groups of reference pixel points from the four sub-images according to an extraction manner set based on the characteristics of the SQD image segmentation manner. Furthermore, the display device calculates the corresponding pixel difference values according to the extracted four groups of reference pixel points, and finally, determines the image segmentation manner of the serial digital interface according to the calculated pixel difference values. That is, based on the detection method of the image segmentation manner provided by the embodiments of the present disclosure, the display device may automatically recognize the segmentation manner of the image transmitted by the serial digital interface, which may save an operation for user to select and improve the user experience.

FIG. 10 is a flow diagram of a detection method of another image segmentation manner provided by some embodiments of the present disclosure. Referring to FIG. 10, the method includes the following steps.

In S1001, four sub-images input by a serial digital interface and formed by dividing an original image are obtained.

In S1002, four groups of reference pixel points are extracted from the four sub-images according to a set extraction manner, and each group of reference pixel points includes a plurality of pixel points.

The set extraction manner may be to extract a plurality of pixel points in a same region in the four sub-images. The same region may be any region with a same position in the four sub-images; for example, it may be an image block with a size of I multiplied by I (I×I) in an upper left, upper right, lower left, lower right or middle region of the four sub-images, and I represents the number of pixel points in the row direction and the column direction of the image block. The same region may also be an irregular image block at any other position, which is not specifically limited in the embodiments of the present disclosure. I may be an integer between 50 to 200; for example, I may be 50, 100, 150 or 200.

It will be understood that, the four groups of reference pixel points extracted according to the set extraction manner are the plurality of pixel points in the same region in the four sub-images. For example, the four groups of reference pixel points may be pixel points in the image block with the size of I multiplied by I (I×I) in the upper left, upper right, lower left, lower right, or middle region of the four sub-images.

Figure 11:
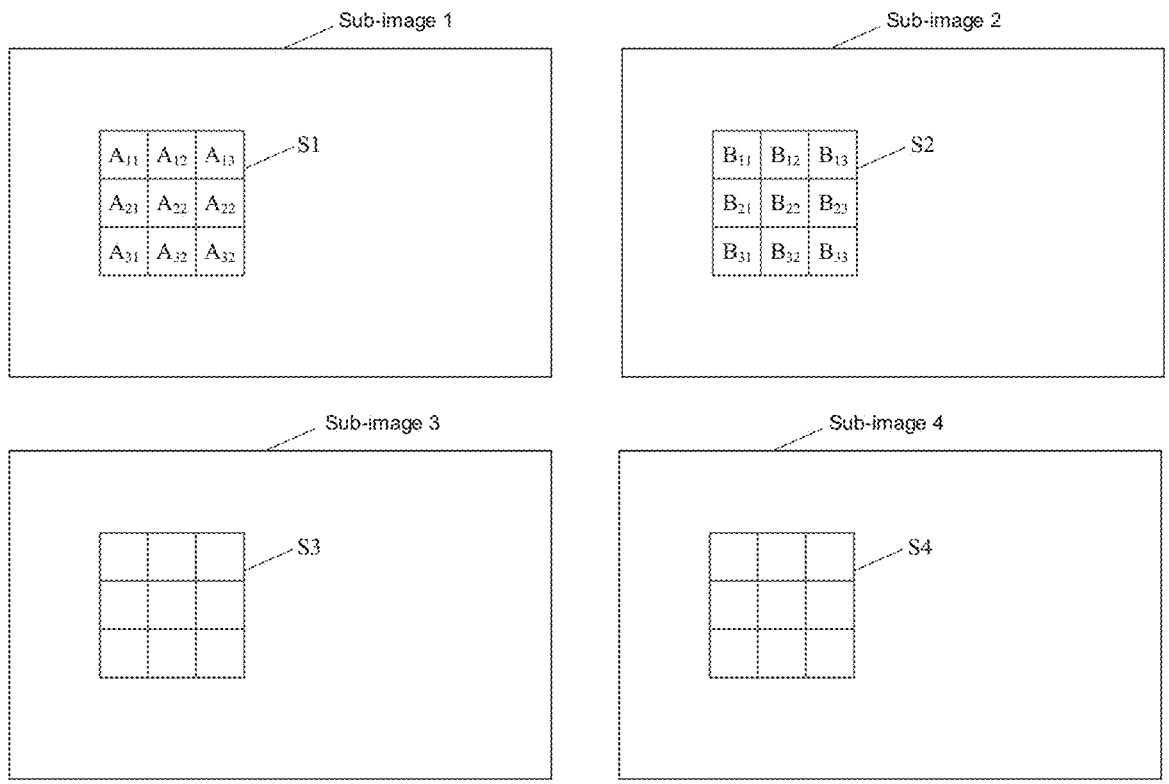
FIG. 11 is a diagram illustrating an example of four groups of reference pixel points.

For example, as shown in FIG. 11, each of the four groups of reference pixel points may be composed of pixel points in an image block with a size of 3 multiplied by 3 (3×3) at the same position in the four sub-images, which are sub-image 1, sub-image 2, sub-image 3 and sub-image 4. For example, the four groups of reference pixel points may be denoted sequentially as S1, S2, S3 and S4.

In S1003, according to the four groups of reference pixel points, a pixel difference value between every two groups of reference pixel points is calculated.

In some embodiments, calculating the pixel difference value between every two groups of reference pixel points includes:
(1) calculating a pixel difference value between pixel points at the same position of every two groups of the four groups of reference pixel points; and
(2) calculating an average value of pixel difference values of every two groups of reference pixel points, and considering the average value as a pixel difference value between the two groups of reference pixel points.

For example, following the previous example, as shown in FIG. 11, two groups of reference pixel points S1 and S2 in the four groups of reference pixel points are considered as an example to illustrate a calculating process of the pixel difference value between the two groups of reference pixel points. It is assumed that pixel points in S1 may be represented as $A_{ij}$, and pixel points in S2 may be represented as $B_{ij}$; i represents a row coordinate of the pixel point in the image block, and j represents a column coordinate of the pixel point in the image block; i is greater than or equal to 1, and less than or equal to 3, and j is greater than or equal to 1, and less than or equal to 3 ($1 \leq i \leq 3$, $1 \leq j \leq 3$). Then, calculating the pixel difference value between the two groups of reference pixel points S1 and S2 includes
(1) calculating pixel difference values between $A_{11}$ and $B_{11}$, $A_{12}$ and $B_{12}$, $A_{13}$ and $B_{13}$, ..., and $A_{33}$ and $B_{33}$; for example, the pixel difference values may be denoted as $G_{11}$, $G_{12}$, $G_{13}$, ..., and $G_{33}$; and (2) calculating an average value of $G_{11}$, $G_{12}$, $G_{13}$, ..., and $G_{33}$. Therefore, the pixel difference value between S1 and S2 may be expressed as: G is equal to $(G_{11}+G_{12}+ \ldots +G_{33})/(3 \times 3)$ ($G = +G_{12}+ \ldots +G_{33})/(3 \times 3)$).

In some embodiments, calculating the pixel difference value between pixel points at the same position of every two groups of the four groups of reference pixel points includes:
(1A) calculating gray scale difference values of sub-pixels with the same color of the pixel points at the same position of every two groups of reference pixel points; and
(1B) calculating an average value of the gray scale difference values of the sub-pixels with the same color, and considering the average value as the pixel difference value between the pixel points at the same position of every two groups of reference pixel points. The gray scale difference value is a difference value of gray scale values.

For example, following the previous example, the pixel points $A_{11}$ and $B_{11}$ at a same position (1, 1) of the two groups of reference pixel points (S1 and S2) are considered as an example. It is assumed that each pixel point includes a red sub-pixel, a green sub-pixel and a blue sub-pixel; then a pixel difference value between $A_{11}$ and $B_{11}$ is calculated. That is, a gray scale difference value between the red sub-pixels of the pixel points $A_{11}$ and $B_{11}$, a gray scale difference value between the green sub-pixels of the pixel points $A_{11}$ and $B_{11}$ and a gray scale difference value between the blue sub-pixels of the pixel points $A_{11}$ and $B_{11}$ are calculated firstly; for example, the gray scale difference values may be denoted as $Gr_{11}$, $Gg_{11}$ and $Gb_{11}$. Further, an average value of the gray scale difference values of the sub-pixels of $A_{11}$ and $B_{11}$ is calculated; that is, an average value of $Gr_{11}$, $Gg_{11}$ and $Gb_{11}$ is calculated. Therefore, the pixel difference value between $A_{11}$ and $B_{11}$ may be expressed as: $G_{11}$ is equal to $(Gr_{11}+Gg_{11}+Gb_{11})/3$ ($G_{11} = (Gr_{11}+Gg_{11}+Gb_{11})/3$).

In some embodiments, it is also possible to only calculate pixel difference values of a certain group of the four groups of reference pixel points and the other three groups of reference pixel points. For example, it is possible to calculate pixel difference values between S1 in the four groups of reference pixel points S1, S2, S3 and S4 and each of S2, S3 and S4.

In S1004, the image segmentation manner of the serial digital interface is determined according to the pixel difference values.

Figure 12:
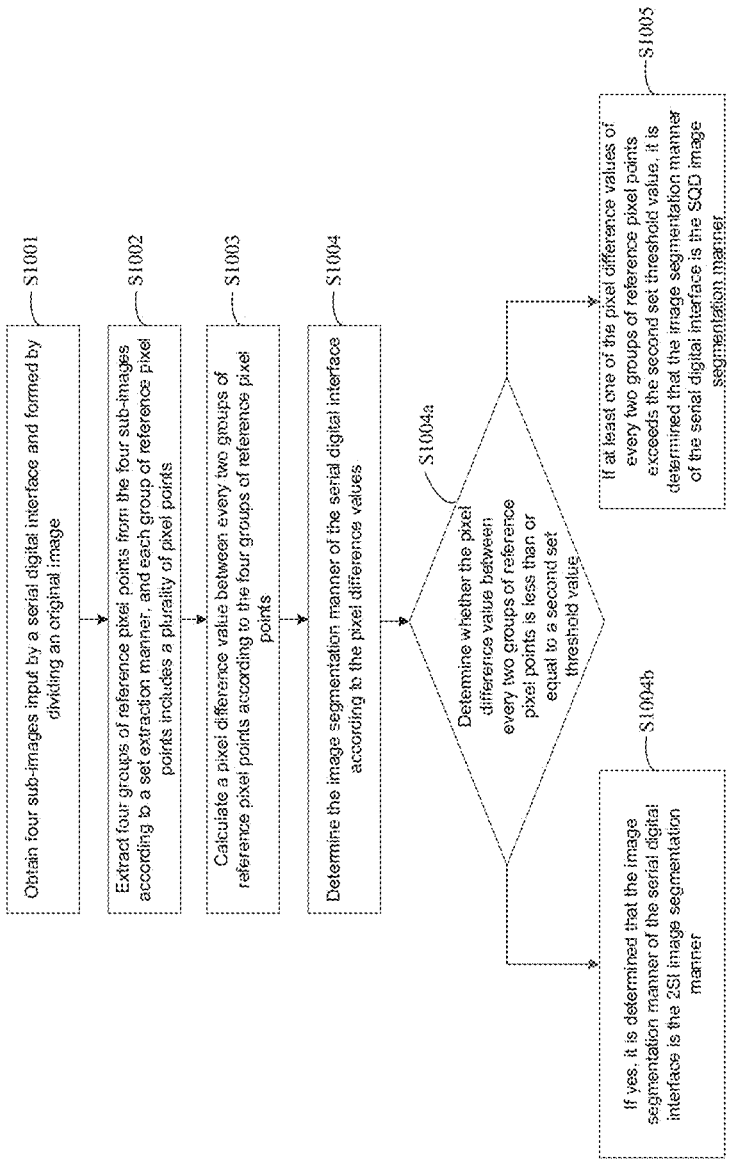
FIG. 12 is a flow diagram of a detection method for yet another image segmentation manner, in accordance with some embodiments.

In some embodiments, as shown in FIG. 12, determining the image segmentation manner of the serial digital interface according to the pixel difference values (i.e., S1004) includes the following sub-steps.

In S1004a, whether the pixel difference value between every two groups of reference pixel points is less than or equal to a second set threshold value is determined.

The second set threshold value may be used to determine the degree of the color difference between the pixel points at the same position in the two groups of reference pixel points. If the pixel difference value between any two groups of reference pixel points is less than or equal to the second set threshold value, it means that the color difference between the pixel points at the same position in the two groups of reference pixel points is small. Conversely, if the pixel difference value between any two groups of reference pixel points is greater than the second set threshold value, it means that the color difference between the pixel points at the same position in the two groups of reference pixel points is large. With respect to a selection of the second set threshold value, it is similar to the selection of the first set threshold value in the previous embodiment, and details may be referred to the related description in S604a, which will not be repeated here.

In S1004b, if yes, it is determined that the image segmentation manner of the serial digital interface is the 2SI image segmentation manner.

It will be understood that, if the pixel difference value of every two groups of reference pixel points is less than or equal to the second set threshold value, it shows that the color difference of the pixel points at the same position of the four sub-images is small, and the four sub-images transmitted by the serial digital interface are formed by dividing the original image through the 2SI image segmentation manner. That is, the image segmentation manner of the serial digital interface is the 2SI image segmentation manner.

In some embodiments, as shown in FIG. 12, the detection method further includes the following step.

In S1005, if at least one of the pixel difference values of every two groups of reference pixel points exceeds the second set threshold value, it is determined that the image segmentation manner of the serial digital interface is the SQD image segmentation manner.

That is, in a case where there is one or more pixel difference values among all calculated pixel difference values are greater than the second set threshold value, it is determined that the image segmentation manner of the serial digital interface is the SQD image segmentation manner. This is because, in a case where there is a pixel difference value between two groups of reference pixel points greater than the second set threshold value, it shows that the color difference between the pixel points at the same position of the two sub-images corresponding to the two groups of reference pixel points is large, which does not accord with the characteristics of the 2SI image segmentation manner. Moreover, the image segmentation manners of the serial digital interface are only SQD and 2SI, so the image segmentation manner of the serial digital interface is the SQD image segmentation manner.

Figure 13:
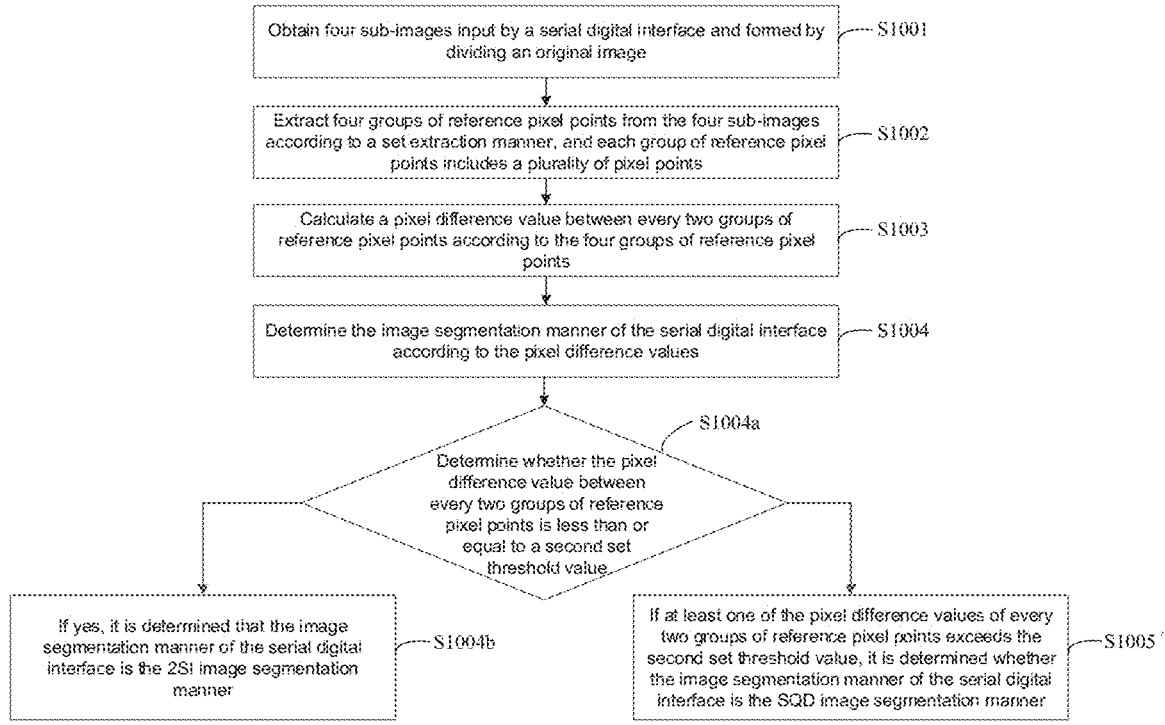
FIG. 13 is a flow diagram of a detection method for yet another image segmentation manner, in accordance with some embodiments.

In some embodiments, as shown in FIG. 13, the detection method further includes the following step.

In S1005', if at least one of the pixel difference values of every two groups of reference pixel points exceeds the second set threshold value, it is determined whether the image segmentation manner of the serial digital interface is the SQD image segmentation manner.

A solution for determining whether the image segmentation manner of the serial digital interface is the SQD image segmentation manner may be referred to the related description in the embodiment shown in FIG. 6, which will not be repeated here.

In the embodiments of the present disclosure, the display device may obtain four sub-images input by the serial digital interface and formed by dividing the original image, and extract four groups of reference pixel points from the four sub-images according to an extraction manner set based on the characteristics of the 2SI image segmentation manner; furthermore, the display device calculates the pixel difference values according to the extracted four groups of reference pixel points, and finally determines the image segmentation manner of the serial digital interface according to the calculated pixel difference values. That is, based on the detection method of the image segmentation manner provided by the embodiments of the present disclosure, the display device may automatically recognize the segmentation manner of the image transmitted by the serial digital interface, which may save the operation for the user to select and improve the user experience.

Figure 14:
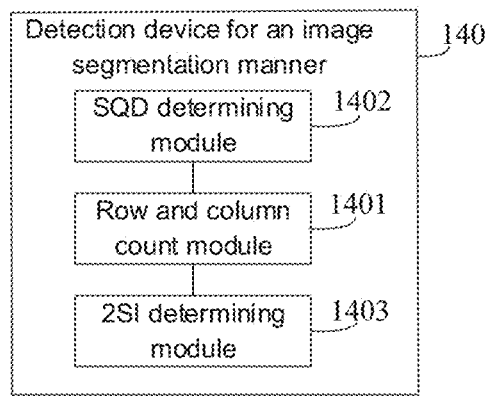
FIG. 14 is a structural diagram of a detection device for an image segmentation manner, in accordance with some embodiments.

FIG. 14 is a structural diagram of a detection device 140 of an image segmentation manner provided by some embodiments of the present disclosure. The detection device 140 of the image segmentation manner is applied to a display.

Referring to FIG. 14, the detection device 140 of the image segmentation manner includes: a row and column count module 1401, an SQD determining module 1402 and a 2SI determining module 1403. The row and column count module 1401 is coupled to a serial digital interface, the SQD determining module 1402 is coupled to the row and column count module 1401, and the 2SI determining module 1403 is coupled to the row and column count module 1401.

The row and column count module 1401 is configured to count rows and columns of the pixels of the four sub-images input by the serial digital interface and formed by dividing the original image, which is convenient for the SQD determining module 1402 to obtain the pixel points at the connecting position of every two sub-images of the four sub-images, and is convenient for the 2SI determining module 1403 to obtain the pixel points in the same region in the four sub-images.

The SQD determining module 1402 is configured to determine whether the image segmentation manner of the serial digital interface is the SQD image segmentation manner according to the pixel points at the connecting position of every two sub-images of the four sub-images that are connected. That is, the SQD determining module 1402 may be utilized to implement S602, S603 and S604 in the detection method, and may also be utilized to implement S1005'.

The 2SI determining module 1403 is configured to determine whether the image segmentation manner of the serial digital interface is the 2SI image segmentation manner according to the pixel points in the same region in the four sub-images. That is, the 2SI determining module 1403 may be utilized to implement S1002, S1003 and S1004 in the detection method, and may also be utilized to implement S605'.

The specific implementation of the SQD determining module 1402 and the 2SI determining module 1403 may be referred to the related description in the above embodiments of the method, which will not be repeated here.

In the embodiments, since the row and column count module 1401 may count the rows and columns of the pixels and extract specific pixel points in the four sub-images, according to the pixel points extracted by the row and column count module 1401, the SQD determining module 1402 may determine whether the image segmentation manner of the serial digital interface is the SQD image segmentation manner, and the 2SI determining module 1403 may determine whether the image segmentation manner of the serial digital interface is the 2SI image segmentation manner. That is, in the embodiments, the segmentation manner of the image transmitted by the serial digital interface may be automatically recognized, which may save the operation for the user to select and improve the user experience.

In some embodiments, the SQD determining module 1402 includes:

an SQD pixel extracting unit that is configured to extract at least two columns or at least two rows of pixel points at the connecting position of every two sub-images that are connected to obtain four groups of reference pixel points;

an SQD difference calculating unit that is configured to calculate the pixel difference value of each group of reference pixel points; and an SQD determining unit that is configured to determine whether the image segmentation manner of the serial digital interface is the SQD image segmentation manner according to the pixel difference values.

In some embodiments, the 2SI determining module 1403 includes:

a 2SI pixel extracting unit that is configured to extract a plurality of pixel points in the same region in the four sub-images to obtain four groups of reference pixel points;

a 2SI difference calculating unit that is configured to calculate the pixel difference value between every two groups of reference pixel points; and a 2SI determining unit that is configured to determine whether the image segmentation manner of the serial digital interface is the 2SI image segmentation manner according to the pixel difference values.

A specific implementation of each unit included in the SQD determining module 1402 and the 2SI determining module 1403 may be referred to the related description in the above embodiments of the method, which will not be repeated here.

Figure 15:
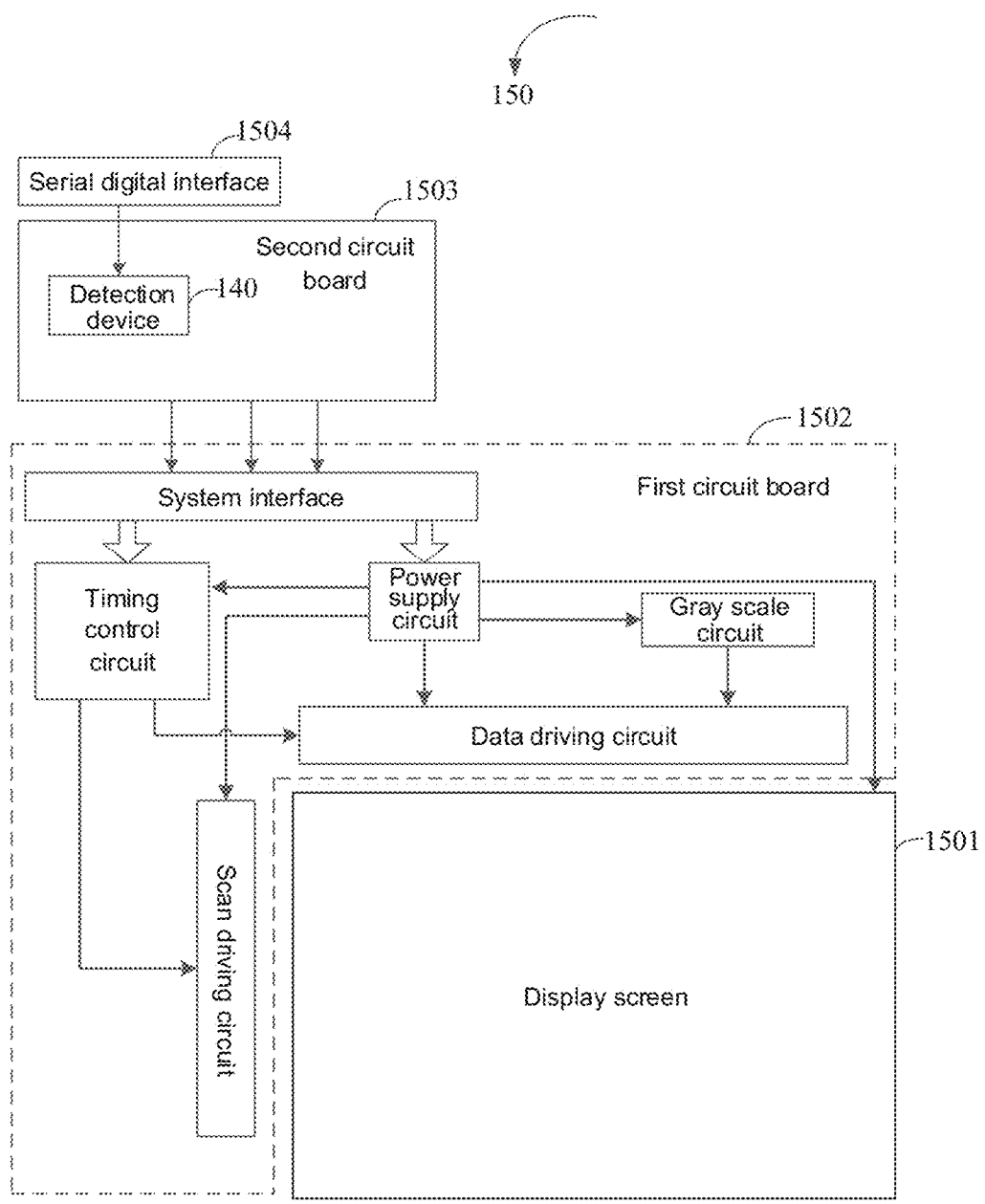
FIG. 15 is a structural diagram of a display device, in accordance with some embodiments.

FIG. 15 is a structural diagram of a display device 150 provided by some embodiments of the present disclosure. Referring to FIG. 15, the display device 150 includes a display screen 1501, a first circuit board 1502 coupled to the display screen 1501, a second circuit board 1503 coupled to the first circuit board 1502, and a serial digital interface 1504 disposed on the second circuit board 1503. The second circuit board is provided with the detection device 140 for the image segmentation manner described in the above embodiments, and the detection device 140 for the image segmentation manner is coupled to the serial digital interface 1504.

The second circuit board 1503 may also be referred to as a whole machine motherboard, and the first circuit board 1502 may also be referred to as a timing controller (TCON) board.

In some embodiments, as shown in FIG. 15, the first circuit board 1502 is provided with a system interface and various driving circuits of the display screen 1501, such as a timing control circuit, a power supply circuit, a gray scale circuit, a scan driving circuit, and a data driving circuit.

Since the display device 150 provided in the embodiments includes the detection device 140 for the image segmentation manner in the above embodiments, technical effects that the display device 150 is capable of obtaining may be referred to the embodiments of the detection device 140 for the image segmentation manner, which will not be repeated here.

In some embodiments of the present disclosure, a computer-readable storage medium (e.g. a non-transitory computer-readable storage medium) is provided, and the computer-readable storage medium stores computer program instructions. When the computer program instructions run on a processor, the processor executes one or more steps in the detection method for the image segmentation manner described in any of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card or a flash memory device (e.g., an erasable programmable read-only memory (EPROM), or a card, a stick or a key driver). Various computer-readable storage media described in the present disclosure may represent one or more devices and/or other machine-readable storage media for storing information. The term "machine-readable storage media" may include, but is not limited to, wireless channels and other various media capable of storing, containing and/or carrying instructions and/or data.

In some embodiments of the present disclosure, a computer program product is provided. The computer program product includes computer program instructions that are stored in a non-transitory computer-readable storage medium. When the computer program instructions are executed on a computer, the computer program instructions make the computer execute one or more steps in the detection method for the image segmentation manner described in the above embodiments.

In some embodiments of the present disclosure, a computer program is provided. When the computer program is executed on a computer, the computer program makes the computer execute one or more steps in the detection method for the image segmentation manner described in the above embodiments.

Beneficial effects of the computer-readable storage medium, computer program product and computer program are the same as beneficial effects of the detection method for the image segmentation manner as described in some of the above embodiments, which will not be repeated here.

The foregoing descriptions are merely specific implementation manners of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. A detection method for an image segmentation manner, comprising:

obtaining four sub-images input by a serial digital interface and formed by dividing an original image;

extracting four groups of reference pixel points from the four sub-images according to a set extraction manner, and each group of reference pixel points including a plurality of pixel points, wherein the set extraction manner is to extract at least two columns or at least two rows of pixel points at a connecting position of every two sub-images that are connected;

calculating pixel difference values of pixel points according to the four groups of reference pixel points; and determining an image segmentation manner of the serial digital interface according to the pixel difference values;

wherein the two sub-images that are connected are a first sub-image and a second sub-image, the first sub-image includes a plurality of first pixel points, and the second sub-image includes a plurality of second pixel points;

for a first sub-image and a second sub-image that are connected in a row direction, an extracted group of reference pixel points includes: at least one column of first pixel points of the first sub-image at a connecting position where the first sub-image and the second sub-image are connected in the row direction, and at least one column of second pixel points of the second sub-image at the connecting position where the first sub-image and the second sub-image are connected in the row direction; and for a first sub-image and a second sub-image that are connected in a column direction, an extracted group of reference pixel points includes: at least one row of first pixel points of the first sub-image at a connecting position where the first sub-image and the second sub-image are connected in the column direction, and at least one row of second pixel points of the second sub-image at the connecting position where the first sub-image and the second sub-image are connected in the column direction.

2. The detection method according to claim 1, wherein for the first sub-image and the second sub-image that are connected in the row direction, a group of reference pixel points includes a column of first pixel points and a column of second pixel points; for the first sub-image and the second sub-image that are connected in the column direction, a group of reference pixel points includes a row of first pixel points and a row of second pixel points;

for the first sub-image and the second sub-image that are connected in the row direction,
calculating the pixel difference values of pixel points according to the four groups of reference pixel points includes:
calculating a pixel gradient value between two pixel points in a same row in a column of first pixel points and a column of second pixel points included in each group of reference pixel points; and
calculating an average value of pixel gradient values according to pixel gradient values of the column of first pixel points and the column of second pixel points, and considering the average value as a pixel difference value of the group of reference pixel points;

for the first sub-image and the second sub-image that are connected in the column direction,
calculating the pixel difference values of pixel points according to the four groups of reference pixel points includes:
calculating a pixel gradient value between two pixel points in a same column in a row of first pixel points and a row of second pixel points included in each group of reference pixel points; and
calculating an average value of pixel gradient values of the row of first pixel points and the row of second pixel points, and considering the average value as a pixel difference value of the group of reference pixel points.

3. The detection method according to claim 2, wherein a pixel point of each sub-image includes sub-pixels with at least two colors;
calculating the pixel gradient value between the two pixel points in the same row in the column of first pixel points and the column of second pixel points included in each group of reference pixel points includes:
calculating a gray scale difference value between sub-pixels with a same color in the two pixel points in the same row; and
calculating an average value of gray scale difference values of sub-pixels of the two pixel points in the same row, and considering the average value as the pixel gradient value between the two pixel points in the same row;
calculating the pixel gradient value between the two pixels in the same column in the row of first pixel points and the row of second pixel points included in each group of reference pixel points includes:
calculating a gray scale difference value between sub-pixels with a same color in the two pixel points in the same column; and
calculating an average value of gray scale difference values of sub-pixels of the two pixel points in the same column, and considering the average value as the pixel gradient value between the two pixel points in the same column.

4. The detection method according to claim 2, wherein determining the image segmentation manner of the serial digital interface according to the pixel difference values includes:
determining whether a pixel difference value of each group of reference pixel points is less than or equal to a first set threshold value; and
if yes, determining that the image segmentation manner of the serial digital interface is a square division (SQD) image segmentation manner.

5. The detection method according to claim 4, further comprising:
if at least one of pixel difference values of groups of reference pixel points exceeds the first set threshold value, determining that the image segmentation manner of the serial digital interface is a 2 sample interleave (2SI) image segmentation manner.

6. The detection method according to claim 4, further comprising:
if at least one of pixel difference values of groups of reference pixel points exceeds the first set threshold value, determining whether the image segmentation manner of the serial digital interface is a 2 sample interleave (2SI) image segmentation manner.

7. A non-transitory computer-readable storage medium storing computer program instructions, wherein the computer program instructions are executed by a processor, and one or more steps of the detection method according to claim 1 are executed.

8. A display device, comprising: a display screen, a first circuit board coupled to the display screen, a second circuit board coupled to the first circuit board and a serial digital interface disposed on the second circuit board; wherein
the second circuit board is provided with the detection device for the image segmentation manner according to claim 1, and the detection device is coupled to the serial digital interface.

9. A detection device for an image segmentation manner, comprising:
a row and column count module coupled to a serial digital interface, wherein the row and column count module is configured to count rows and columns of pixels of four sub-images input by the serial digital interface and formed by dividing an original image;
a square division (SQD) determining module coupled to the row and column count module, wherein the SQD determining module is configured to determine whether an image segmentation manner of the serial digital interface is an SQD image segmentation manner according to pixel points at a connecting position of every two sub-images in the four sub-images that are connected; and
a 2 sample interleave (2SI) determining module coupled to the row and column count module, wherein the 2SI determining module is configured to determine whether the image segmentation manner of the serial digital interface is a 2SI image segmentation manner according to pixel points in a same region in the four sub-images, wherein the same region is any region with a same position in the four sub-images;

wherein the SQD determining module includes:
an SQD pixel extracting unit configured to extract at least two columns or at least two rows of pixel points at the connecting position of every two sub-images that are connected to obtain four groups of reference pixel points;
an SQD difference calculating unit configured to calculate a pixel difference value of each group of reference pixel points; and
an SQD determining unit configured to determine whether the image segmentation manner of the serial digital interface is the SQD image segmentation manner according to pixel difference values;
wherein the two sub-images that are connected are a first sub-image and a second sub-image, the first sub-image includes a plurality of first pixel points, and the second sub-image includes a plurality of second pixel points;
for a first sub-image and a second sub-image that are connected in a row direction, the SQD pixel extracting unit is further configured to:
extract at least one column of first pixel points of the first sub-image at a connecting position where the first sub-image and the second sub-image are connected in the row direction, and
extract at least one column of second pixel points of the second sub-image at the connecting position where the first sub-image and the second sub-image are connected in the row direction;
for a first sub-image and a second sub-image that are connected in a column direction, the SQD pixel extracting unit is further configured to:
extract at least one row of first pixel points of the first sub-image at a connecting position where the first sub-image and the second sub-image are connected in the column direction, and
extract at least one row of second pixel points of the second sub-image at the connecting position where the first sub-image and the second sub-image are connected in the column direction.

10. The detection device according to claim 9, wherein the 2SI determining module includes:
a 2SI pixel extracting unit configured to extract a plurality of pixel points in a same region in the four sub-images to obtain four groups of reference pixel points;
a 2SI difference calculating unit that is configured to calculate a pixel difference value between every two groups of pixel points; and
a 2SI determining unit configured to determine whether the image segmentation manner of the serial digital interface is the 2SI image segmentation manner according to pixel difference values.

11. A detection method for an image segmentation manner, comprising:
obtaining four sub-images input by a serial digital interface and formed by dividing an original image;
extracting four groups of reference pixel points from the four sub-images according to a set extraction manner, and each group of reference pixel points including a plurality of pixel points, wherein the set extraction manner is to extract a plurality of pixel points in a same region in the four sub-images, and the same region is any region with a same position in the four sub-images;
calculating pixel difference values of pixel points according to the four groups of reference pixel points; and
determining an image segmentation manner of the serial digital interface according to the pixel difference values;

wherein calculating the pixel difference values of pixel points according to the four groups of reference pixel points includes:
calculating a pixel difference value between pixel points at a same position of every two groups of reference pixel points in the four groups of reference pixel points; and
calculating an average value of pixel difference values of every two groups of reference pixel points, and considering the average value as a pixel difference value between two groups of reference pixel points;
wherein a pixel point of each sub-image includes sub-pixels with at least two colors;
calculating the pixel difference value between pixel points at the same position of every two groups of reference pixel points in the four groups of reference pixel points includes:
calculating a gray scale difference value between sub-pixels with a same color in the pixel points at the same position of every two groups of reference pixel points; and
calculating an average value of gray scale difference values of sub-pixels with the same color, and considering the average value as a pixel difference value between pixel points at the same position of two groups of reference pixel points.

12. The detection method according to claim 11, wherein determining the image segmentation manner of the serial digital interface according to the pixel difference value includes:
determining whether a pixel difference value between every two groups of reference pixel points is less than or equal to a second set threshold value; and
if yes, determining that the image segmentation manner of the serial digital interface is a 2 sample interleave (2SI) image segmentation manner.

13. The detection method according to claim 12, further comprising:
if at least one of the pixel difference values of every two groups of reference pixel points exceeds the second set threshold value, determining that the image segmentation manner of the serial digital interface is a square division (SQD) image segmentation manner.

14. The detection method according to claim 12, further comprising:
if at least one of the pixel difference values of every two groups of reference pixel points exceeds the second set threshold value, determining whether the image segmentation manner of the serial digital interface is a square division (SQD) image segmentation manner.

15. A non-transitory computer-readable storage medium storing computer program instructions, wherein the computer program instructions are executed by a processor, and one or more steps of the detection method according to claim 11 are executed.

16. A display device, comprising: a display screen, a first circuit board coupled to the display screen, a second circuit board coupled to the first circuit board and a serial digital interface disposed on the second circuit board; wherein
the second circuit board is provided with the detection device for the image segmentation manner according to claim 11, and the detection device is coupled to the serial digital interface.

* * * * *